United States Patent [19]

Jinnai

[11] Patent Number: 4,491,852

[45] Date of Patent: Jan. 1, 1985

[54] INK JET PRINTING APPARATUS USING GUARD DROPS

[75] Inventor: Koichiro Jinnai, Kawasaki, Japan

[73] Assignee: Ricoh Company, Ltd., Tokyo, Japan

[21] Appl. No.: 509,392

[22] Filed: Jun. 30, 1983

[30] Foreign Application Priority Data

Jul. 2, 1982 [JP] Japan ............ 57-116070
Jul. 20, 1982 [JP] Japan ............ 57-126028

[51] Int. Cl.[3] ............ G01D 15/18
[52] U.S. Cl. ............ 346/75; 346/140 R
[58] Field of Search ............ 346/75, 140 R

[56] References Cited

U.S. PATENT DOCUMENTS 3,562,757 2/1971 Bischoff ............ 346/75
3,828,354 8/1974 Hilton ............ 346/75 X
3,833,910 9/1974 Chen ............ 346/75 X
4,086,601 4/1978 Fillmore ............ 346/75
4,371,878 2/1983 Jinnai ............ 346/75
4,427,986 1/1984 Iyoda ............ 346/75 X

*Primary Examiner*—Joseph W. Hartary
*Attorney, Agent, or Firm*—David G. Alexander

[57] ABSTRACT

An ink jet printing apparatus is disclosed in which ink drops are ejected sequentially from a head to print out dots on a recording medium. A predetermined number of guard drops are interpolated between adjacent printing drops. Guard drops selected out of the interpolated ones are charged to a same polarity as the printing drops and to a predetermined level, which is far lower than that for the printing drops. The charging is effected particularly on guard drops which lie in a high deflection step range.

12 Claims, 11 Drawing Figures

| DEFLECTION STEP | NUMBER INDICATED BY 5 BITS | 5 BITS TO ADDRESS COUNTER 12 | | | | |
|---|---|---|---|---|---|---|
| | | A | B | C | D | E |
| 1 | 0 | 0 | 0 | 0 | 0 | 0 |
| 2 | 1 | 0 | 0 | 0 | 0 | 1 |
| 3 | 2 | 0 | 0 | 0 | 1 | 0 |
| 4 | 3 | 0 | 0 | 0 | 1 | 1 |
| 5 | 4 | 0 | 0 | 1 | 0 | 0 |
| 6 | 5 | 0 | 0 | 1 | 0 | 1 |
| 7 | 6 | 0 | 0 | 1 | 1 | 0 |
| 8 | 7 | 0 | 0 | 1 | 1 | 1 |
| 9 | 8 | 0 | 1 | 0 | 0 | 0 |
| 10 | 9 | 0 | 1 | 0 | 0 | 1 |
| 11 | 10 | 0 | 1 | 0 | 1 | 0 |
| 12 | 11 | 0 | 1 | 0 | 1 | 1 |
| 13 | 12 | 0 | 1 | 1 | 0 | 0 |
| 14 | 13 | 0 | 1 | 1 | 0 | 1 |
| 15 | 14 | 0 | 1 | 1 | 1 | 0 |
| 16 | 15 | 0 | 1 | 1 | 1 | 1 |
| 17 | 16 | 1 | 0 | 0 | 0 | 0 |
| 18 | 17 | 1 | 0 | 0 | 0 | 1 |
| 19 | 18 | 1 | 0 | 0 | 1 | 0 |
| 20 | 19 | 1 | 0 | 0 | 1 | 1 |
| 21 | 20 | 1 | 0 | 1 | 0 | 0 |
| 22 | 21 | 1 | 0 | 1 | 0 | 1 |
| 23 | 22 | 1 | 0 | 1 | 1 | 0 |
| 24 | 23 | 1 | 0 | 1 | 1 | 1 |
| 25 | 24 | 1 | 1 | 0 | 0 | 0 |
| 26 | 25 | 1 | 1 | 0 | 0 | 1 |
| 27 | 26 | 1 | 1 | 0 | 1 | 0 |
| 28 | 27 | 1 | 1 | 0 | 1 | 1 |
| 29 | 28 | 1 | 1 | 1 | 0 | 0 |
| 30 | 29 | 1 | 1 | 1 | 0 | 1 |
| 31 | 30 | 1 | 1 | 1 | 1 | 0 |
| 32 | 31 | 1 | 1 | 1 | 1 | 1 |

INK JET PRINTING APPARATUS USING GUARD DROPS

BACKGROUND OF THE INVENTION

The present invention relates to an ink jet printing apparatus of the type which ejects ink drops from an ink jet head and charges and deflects them to print out data on a recording sheet. More particularly, the present invention is concerned with an ink jet printing apparatus which compensates for print distortions and thereby enhance high quality data reproduction by interpolating guard drops between adjacent printing drops which are adapted to compensate for the influence of a charge deposited on an immediately preceding printing drop.

In an ink jet printer of the type described, charged ink drops fly adjacent to each other so that the air resistance, Coulomb's force and like factors may effect the spacing between the adjacent ink drops or the immediately preceding charged drop may reduce a charge on a following drop which is about to be charged. This would disturb the flight of the drops to develop print distortions on a recording medium and thereby prevent reproduction of clear-cut images. Thus, implementations have been proposed for compensating the flight of ink drops. While the compensation may be achieved most easily by shortening the distance between the ink jet head and the recording medium, such requires an increase in the amount of charge to be deposited on printing drops. An increase in the charge, however, would cause the charged printing drop to charge a succeeding uncharged printing drop to the opposite polarity, again resulting in print distortions.

As has been proposed in Japanese patent publication No. 42334/1977, for example, the print distortions may be coped with by inserting a guard drop between adjacent printing drops for compensation purpose. This expedient still suffers from the following drawbacks which were confirmed by experiments. The guard drop between two adjacent printing drops becomes charged by preceding one of the printing drops to a polarity opposite to the latter and, due to the resulting Coulomb's force therebetween, the guard drop is caused to join the printing drop. Also, the adjacent printing drops tend to join each other because attraction acting between the guard drop and the preceding printing drop serves to shorten the distance between the printing drops, or they tend to more intensely effect each other, if not join each other, to thereby noticeably degrade the reproduced data. Such a tendency is particularly pronounced in a high deflection step range, in which the amount of charge is significant.

The present invention contemplates to overcome the problem discussed above by suitably determining the number of guard drops interpolated between printing drops and a charging level for the guard drops. Although the patent publication mentioned describes a technique for charging guard drops, it is nothing more than giving guard drops a charge higher than those on printing drops in order to suppress charge repulsion between adjacent printing drops. That is, it does not even suggest a unique charging system for guard drops in accordance with the present invention which also takes into account the attraction between a charging ink drop and guard drops.

SUMMARY OF THE INVENTION

It is therefore an object of the present invention to provide a new and improved charge control type ink jet printing apparatus which achieves quality image reproduction by eliminating print distortions.

It is another object of the present invention to provide a charge control type ink jet printing apparatus which is capable of compensating for print distortions due to mutual influence of adjacent printing drops.

It is another object of the present invention to provide a charge control type ink jet printing apparatus which is capable of preventing a printing drop and a guard drop or adjacent printing drops from joining each other.

It is another object of the present invention to provide a generally improved ink jet printing apparatus using guard drops.

An ink jet printing apparatus embodying the present invention ejects an ink drop from a head thereof and charges and deflects it to print out a dot on a recording medium. The apparatus includes guard drop inserting means for inserting at least one guard drop between adjacent ones of printing drops. The guard drop is selectively charged by guard drop charging means. The guard drop charging means is controlled by control means in order to charge the guard drop to a same polarity as the printing drops and to a predetermined level.

The above and other objects, features and advantages of the present invention will become apparent from the following detailed description taken with the accompanying drawings.

DESCRIPTION OF THE PREFERRED EMBODIMENTS

While the ink jet printing apparatus using guard drops of the present invention is susceptible of numerous physical embodiments, depending upon the environment and requirements of use, substantial numbers of the herein shown and described embodiments have been made, tested and used, and all have performed in an eminently satisfactory manner.

Referring to FIGS. 1*a*–1*d* of the drawings, there are schematically shown some exemplary strings of printing ink drops and guard drops in accordance with the present invention. In all these drawings, dots indicate charged printing drops, circles uncharged guard drops, hatched circles guard drops which have been charged at a predetermined low level, and crosswise hatched circles guards drops each having been charged at a low level which is proportional to a charge on an immediately preceding printing drop. An arrow A designates a low deflection range and an arrow B, a high deflection range. The drops, whether printing or guard, are supposed to be flying in a direction indicated by an arrow C.

Figures 1A, 1B, 1C, 1D:
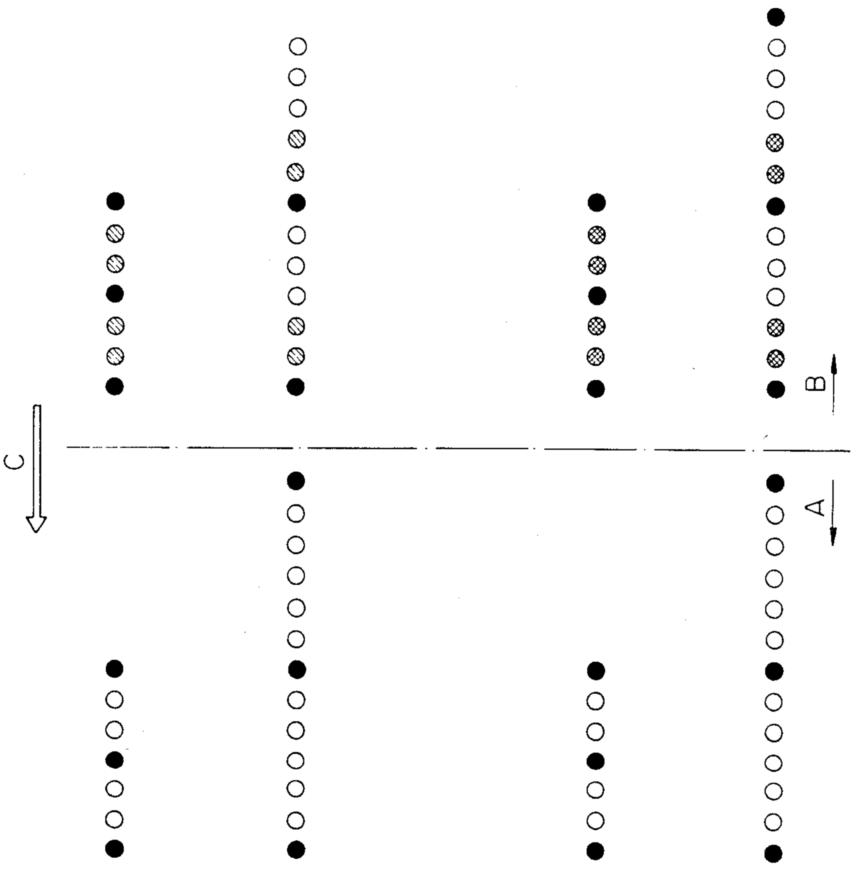
FIGS. 1*a*–1*d* are schematic views of exemplary strings of ink drops each including printing drops and guard drops.

In FIG. 1*a*, a string of one or more guard drops intervene between two adjacent printing drops in the low deflection range A, which comprises the 1st to 24th deflection steps. In the high deflection range B, which covers the 25th to 32nd deflection steps, adjacent printing drops are isolated from each other by one or more guard drops each of which has been charged at a predetermined low level and to a same polarity as the printing drops.

In FIG. 1*b*, one or more guard drops fly in succession between two printing drops in the low deflection range A which, again, covers the 1st to 24th deflection steps. In the high deflection range B covering the 25th to 32nd deflection steps, two adajcent printing drops have therebetween a combined string of one or more guard drops charged at a predetermined small level and to a same polarity as the printing drops and the previously mentioned uncharged guard drops.

In FIG. 1*c*, one or more uncharged guard drops are interposed between two adjacent printing drops in the 1st to 24th deflection steps or low deflection range A. Meanwhile, in the 25th to 32nd deflection steps or high deflection range B, two adjacent printing drops have therebetween one or more guard drops which have been charged to a same polarity as the printing drops and at different low levels in proportion to a charge on their immediately preceding printing drop.

Further, in FIG. 1*d*, one or more uncharged guard drops intervene between successive printing drops in the 1st to 24th deflection steps or low deflection range A. In the 25th to 32nd deflection steps or high deflection range B, there exists between adjacent printing drops a combined string of uncharged guard drops and guard drops which have been charged to a same polarity as the printing drops and at different low levels in proportion to their immediately preceding printing drop.

Figure 2:
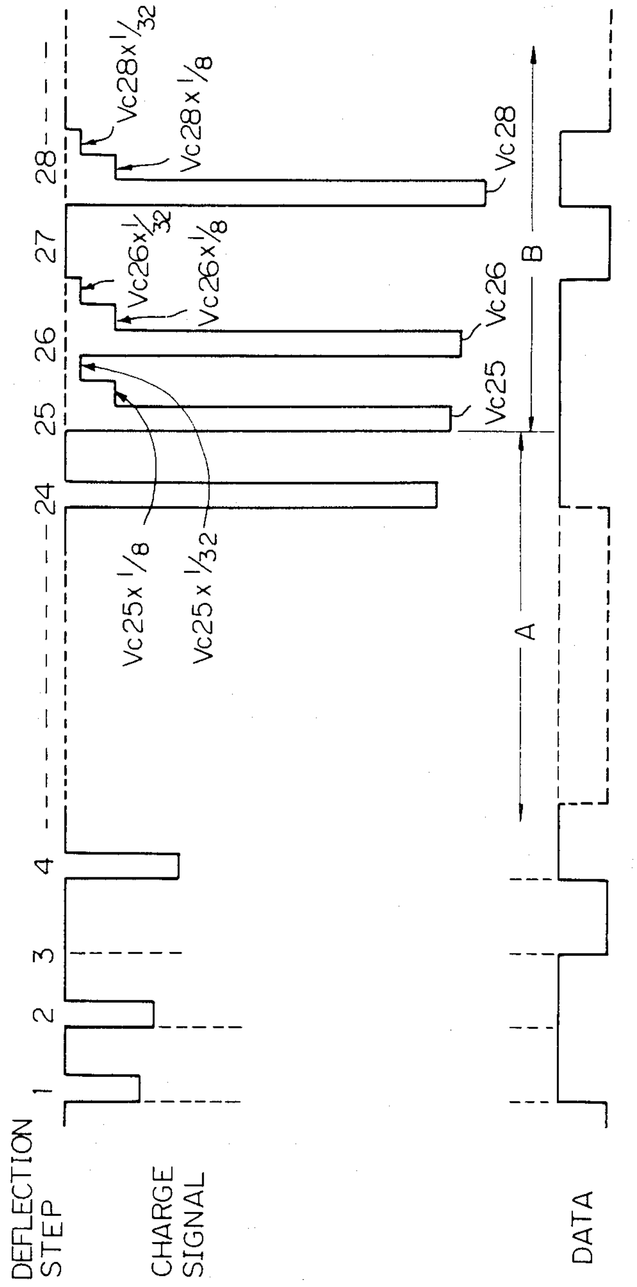
FIG. 2 is a waveform diagram showing a charging voltage applicable to the drop arrangement shown in FIG. 1*c*.

Referring to FIG. 2, a waveform is shown which represents a charge signal for providing the strings of drops shown in FIG. 1*c* by way of example. In this example, guard drops are not charged at all in the low deflection range A which covers the first to 24th steps as already mentioned. Meanwhile, in the deflection range B higher than the 24th step, guard drops are individually charged at different levels in proportion to a charge deposited on their immediately preceding printing drop. Here, considering the fact that the first guard drop just after a given charged printing drop undergoes a charge distortion of 12–13% and the second guard drop, a charge distortion of about 3%, the charge on the first guard drop is selected to be $\frac{1}{8}$ (12.5%) the charge on the printing drop flying ahead and the charge on the second guard drop, 1/32 (3.125%). This will be described later in more detail.

Figure 3:
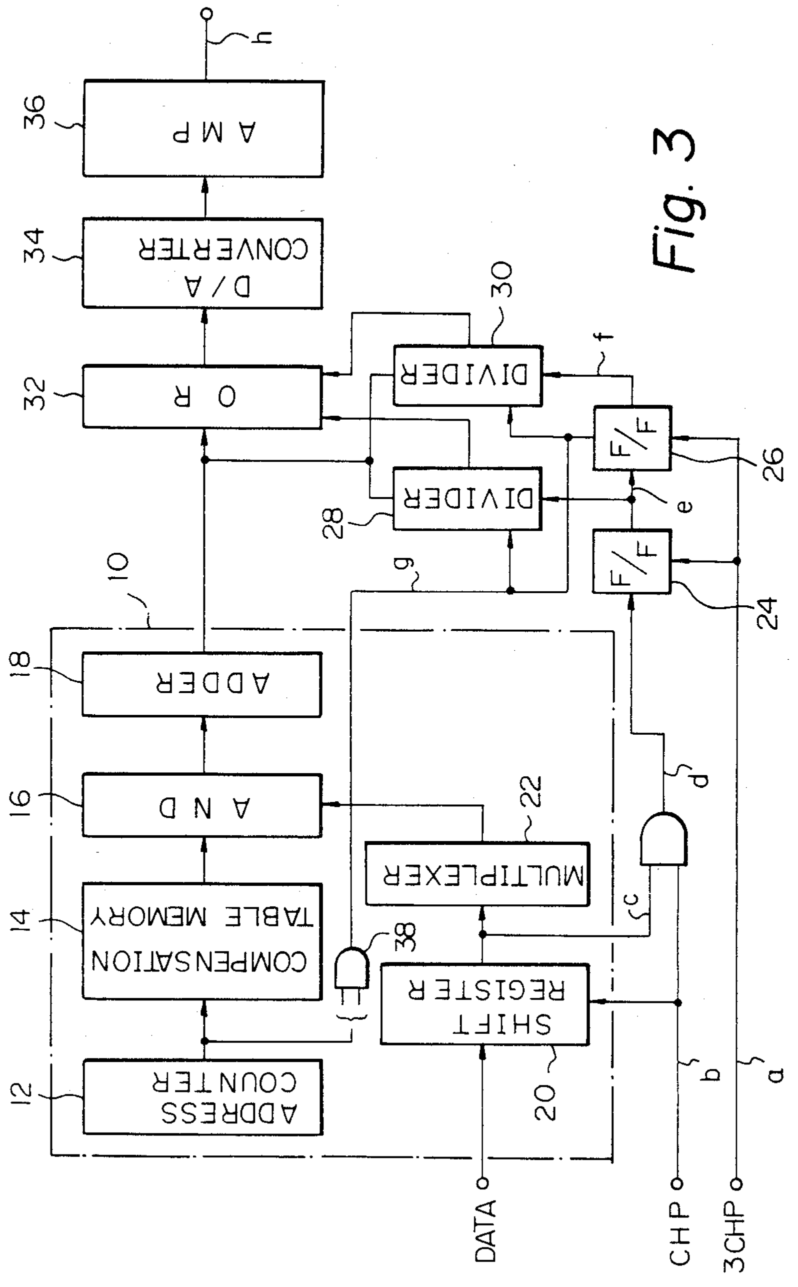
FIG. 3 is a block diagram of a charge control circuit in accordance with the present invention.
Figure 4:
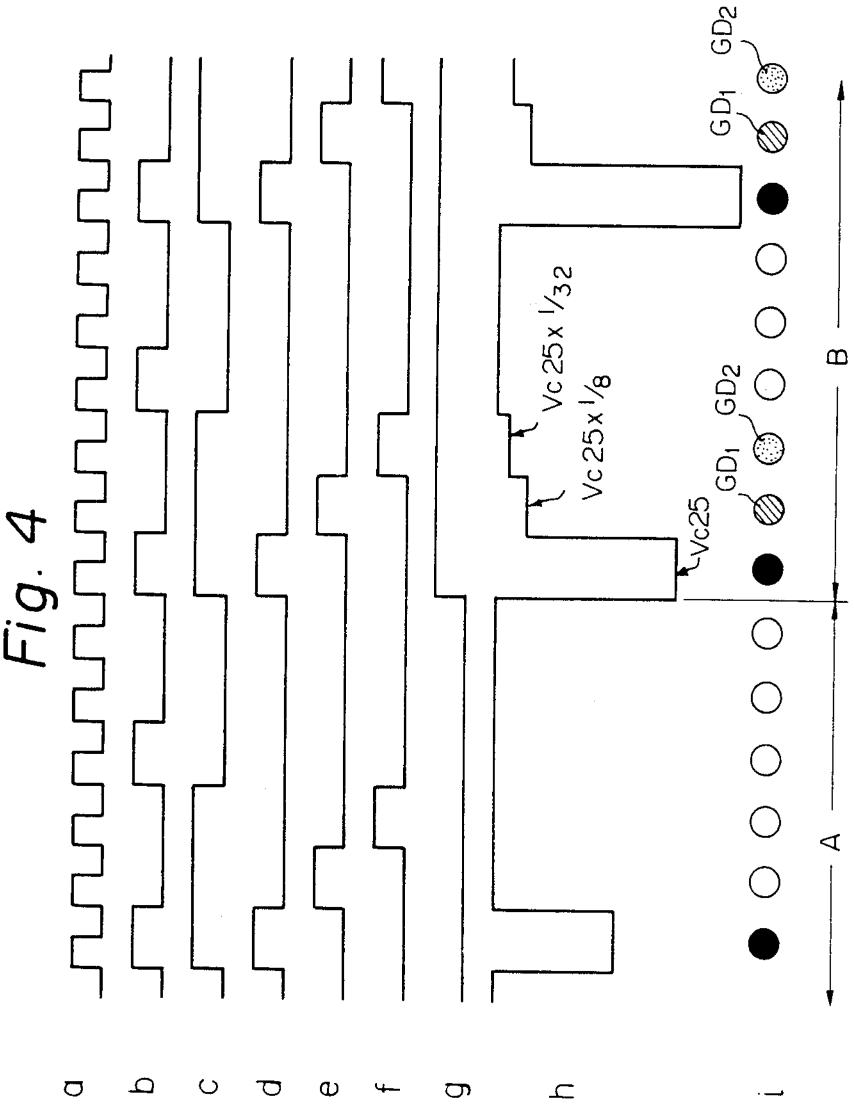
FIG. 4 is a waveform diagram showing signals which appear in various portions of the circuit of FIG. 3.

Referring to FIG. 3, the block diagram shows an example of a charge control circuit for charging printing drops and guard drops in the manner described above. The charge control circuit includes a print distortion compensate circuit which is generally designated by the reference numeral 10 and enclosed by a dash-and-dot line. As shown, the circuit 10 comprises an address counter 12, a compensation table memory (ROM) 14, an AND gate 16, an adder 18, a shift register 20 and a multiplexer 22. The charge control circuit also includes D-type flip-flops 24 and 26, a $\frac{1}{8}$ divider 28, a 1/32 divider 30, an OR gate 32, a digital-to-analog (D/A) converter 34 and a charge signal amplifier 36. Signals having waveforms as shown in FIG. 4 will appear in various portions of the charge control circuit.

In FIG. 3, print data is generated by a print signal generator (not shown) and fed therefrom to the shift register 20. At this instant, the whole compensator circuit 10 compensates for print distortions in accordance with a charge condition pattern for a print drop group which is stored in the compensation table memory 14, instead of relying on the presence/absence of the preceding and succeeding printing drops which were charged or are to be charged in response to a character or picture signal. Basic charge codes and compensation codes for printing drops are stored in the memory 14. The D/A converter 34 transforms a coded signal into a voltage level which corresponds to the code. The analog output of the D/A converter 34 is fed to a charging electrode via the charge signal amplifier 36. Such a method is successful to control deflections of charged printing drops in an adequate manner. A charge voltage variable stepwise from 80 V over to 260 V is applied to the charging electrode so that the deflection may be varied stepwisely from the minimum to the maximum in order to print out dots on a recording medium.

Meanwhile, a charge voltage of about 25.5 V is applied to the charging electrode for the purpose of charging guard drops to a same polarity as printing drops and at a predetermined low level. Supposing a charge voltage E, the predetermined low level is produced by:

$$E = \frac{(260 + 80)}{2} \times 0.15 = 25.5 \text{ (V)}$$

where 0.15 is the distortion rate.

The system described above substantially reduces the charge of the opposite polarity induced on a guard drop and thereby prevents the guard drop from joining the adjacent charged printing drop.

In accordance with the present invention, farther implementations are employed so that the print distortions may be compensated for in a more favorable and effective manner. That is, guard drops are charged to a same polarity as printing drops and at low levels which will give them different charges in proportion to a charge on an immediately preceding printing drop. The so charged guard drops are inserted between two adjacent printing drops, particularly in the high deflection range B. Most preferably, the first guard drop $GD_1$ immediately after a given printing drop is charged by a voltage which is $\frac{1}{8}$ the voltage for the printing drop, while the second guard drop $GD_2$ after the first is charged by a voltage which is 1/32 the voltage for the printing drop. For example, as shown in FIG. 4, the first and second guard drops $GD_1$ and $GD_2$ between printing drops which were respectively charged to the 25th and 26th deflection steps will be charged by voltages $E_{25-1}$ and $E_{25-2}$ which are respectively selected as shown below:

$$E_{25\text{-}1} = Vc_{25} \times 1/8$$

$$E_{25\text{-}2} = Vc_{25} \times 1/32$$

Figure 5:
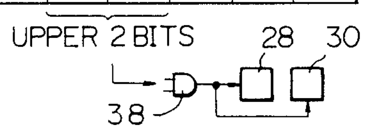
FIG. 5 is a table showing 5-bit outputs of an address counter included in the circuit of FIG. 3.

Referring to FIG. 5, the address counter 12 shown in FIG. 3 will produce 5-bit outputs as illustrated at the various deflection steps. Upper two bits of each address counter output are transferred via the AND gate 38 to the 1/8 divider 28 and 1/32 divider 30. As a result, voltages 1/8 and 1/32 the basic charge voltage will be respectively applied to the first guard drop $GD_1$ and second guard drop $GD_2$ only in the high deflection range B, as shown in FIGS. 2 or 4.

Figure 6:
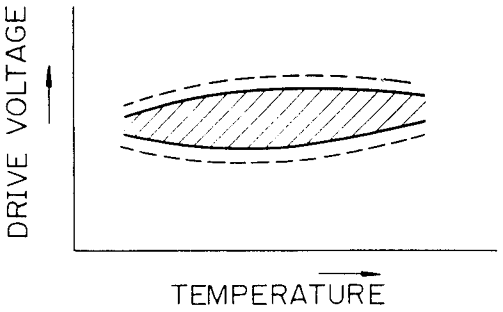
FIG. 6 is a graph showing a usable range of a head drive voltage.

Now, a suitable preventive measure has to be taken against unexpected microscopic drops, generally called "satellites", or the like which may develop between adjacent expected ink drops. In this connection, FIG. 6 shows a usable range of a drive voltage for an ink ejection head which is related to a separation region of an ink stream into a drop. In this type of printer, the usable voltage range may be substantially enlarged over a wide range of ambient temperatures, as indicated by phantom lines. The solid lines in FIG. 6 are indicative of a usable voltage range particular to a prior art printer.

Figure 7:
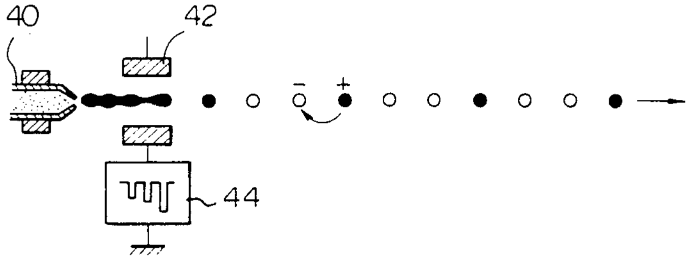
FIG. 7 is a schematic view showing a manner of ejecting ink drops and charging the ejected ink drops.
Figure 8:
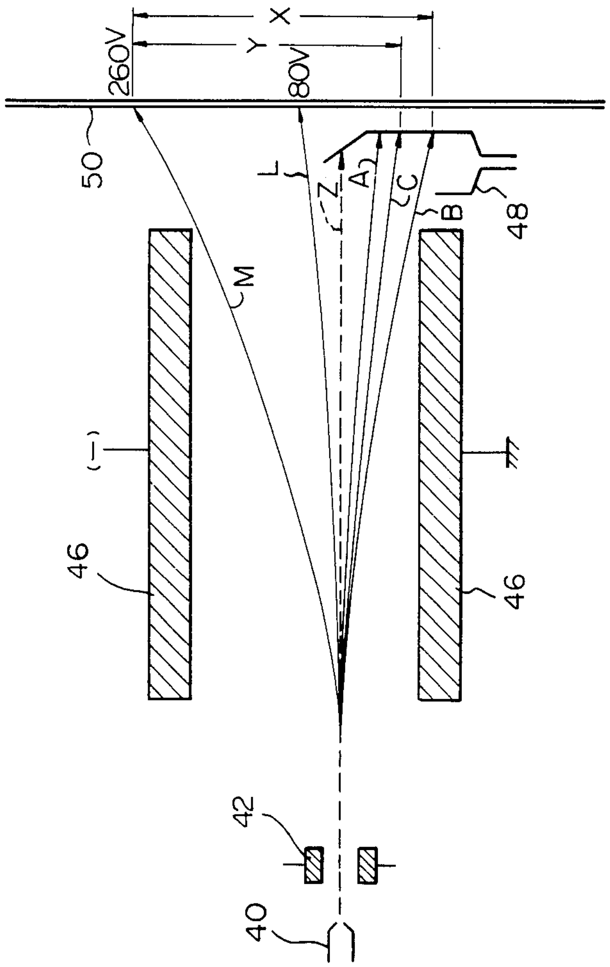
FIG. 8 is a schematic diagram showing paths which ink drops deflected to different steps follow.

FIG. 7 illustrates a manner of ink ejection and charging, while FIG. 8 shows deflections of ink drops separated from the ink stream. Shown in these drawings are an ink jet head 40, a charging electrode 42, a charge control circuit described with reference to FIG. 3, deflection electrodes 46, a gutter 48 and a recording medium 50. Again, printing drops are indicated by dots and guard drops by circles. In FIG. 8, M indicates a path for drops deflected to the maximum step, L a path for drops deflected to the minimum step, Z a zero deflection path, A a path for phase searching drops (gutter level), B a path for guard drops originally uncharged but effected by the maximum deflection droplet, and C a path for guard drops charged at a predetermined low level or at a level proportional to a charge on their immediately preceding drop in accordance with the principle of the present invention. In detail, while the drop in the path B has been charged to $-260\ (V) \times 0.125 = 32.5\ (V)$ by a drop flying ahead, the drop in the path C has been charged to a same polarity as printing drops at a predetermined low level or a level proportional to a charge distortion. Therefore, the drops in the path C becomes deflected less than the drops in the path B. Thus, in accordance with the present invention, the deflection range is reduced from the conventional range X to a unique narrower range Y which permits the apparatus to be designed small size.

Various modifications will become possible for those skilled in the art after receiving the teachings of the present disclosure without departing from the scope thereof.

What is claimed is:

1. An ink jet printing apparatus in which an ink drop ejected from a head is charged and then deflected to print out a dot on a recording medium, said apparatus comprising:

guard drop inserting means for inserting at least one guard drop between adjacent ones of printing drops;

guard drop charging means for selectively charging the guard drop; and control means for controlling said guard drop charging means in order to cause the guard drop charging means to charge the guard drop to a same polarity as the printing drops and to a predetermined level;

said predetermined level being selected to be high enough to prevent merging of the drops due to attraction and low enough to prevent spreading of the drops along the ink jet path due to repulsion.

2. An apparatus as claimed in claim 1, in which one guard drop is interpolated between adjacent printing drops.

3. An apparatus as claimed in claim 1, in which a plurality of guard drops are interpolated between adjacent printing drops.

4. An apparatus as claimed in claim 3, in which the control means is constructed to control the charging means to charge part of the guard drops to a same polarity as the printing drops and to a predetermined level while maintaining the other part unchanged.

5. An apparatus as claimed in claim 3, in which the control means is constructed to control the charging means to charge all the guard drops to a same polarity as the printing drops and to a predetermined level.

6. An apparatus as claimed in claim 1, in which the control means is constructed to control the charging means to maintain guard drops in a low deflection step range uncharged and charge guard drops in a high deflection step range to a same polarity as the printing drops and to a predetermined level.

7. An apparatus as claimed in claim 1, in which the printing drops comprise ones which contribute to the reproduction of data and ones which are collected without contributing to the data reproduction.

8. An apparatus as claimed in claim 7, in which the control means is constructed to control the charging means to charge the guard drops to a same polarity as the printing drops contributing to the data reproduction and to a predetermined level.

9. An apparatus as claimed in claim 7, in which the control means is constructed to control the charging means to charge the guard drops to a same polarity as the printing drops not contributing to the data reproduction and to a predetermined level.

10. An apparatus as claimed in claim 1, in which said predetermined level is selected such that the guard drop is prevented from joining either of the adjacent printing drops.

11. An apparatus as claimed in claim 1, in which first and second guard drops are interpolated between adjacent printing drops, the control means being constructed to control the charging means to charge the first and second guard drops to a same polarity as the printing drops and to first and second predetermined levels respectively, the first predetermined level being higher than the second predetermined level.

12. An apparatus as claimed in claim 11, in which a third guard drop is interpolated after the second guard drop, the control means being constructed to maintain the third guard drop uncharged.

* * * * *